US011101557B2

(12) United States Patent
Mack et al.

(10) Patent No.: US 11,101,557 B2
(45) Date of Patent: *Aug. 24, 2021

(54) MECHANICALLY STEERED AND HORIZONTALLY POLARIZED ANTENNA FOR AERIAL VEHICLES, AND ASSOCIATED SYSTEMS AND METHODS

(71) Applicant: Insitu, Inc., Bingen, WA (US)

(72) Inventors: Torsten Mack, Portland, OR (US); Peter Kunz, Hood River, OR (US)

(73) Assignee: Insitu, Inc., Bingen, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/859,648

(22) Filed: Apr. 27, 2020

(65) Prior Publication Data
US 2020/0295455 A1    Sep. 17, 2020

Related U.S. Application Data

(60) Division of application No. 16/059,489, filed on Aug. 9, 2018, now Pat. No. 10,673,134, which is a
(Continued)

(51) Int. Cl.
*H01Q 3/02* (2006.01)
*H01Q 3/00* (2006.01)
(Continued)

(52) U.S. Cl.
CPC ............ *H01Q 3/02* (2013.01); *H01Q 1/1257* (2013.01); *H01Q 1/28* (2013.01); *H01Q 1/282* (2013.01);
(Continued)

(58) Field of Classification Search
CPC ............ H01Q 3/02; H01Q 1/28; H01Q 3/005; H01Q 1/1257; H01Q 1/282; H01Q 3/04;
(Continued)

(56) References Cited

U.S. PATENT DOCUMENTS 5,463,401 A * 10/1995 Iwasaki ............... H01Q 1/1257
342/359
5,517,204 A   5/1996 Murakoshi et al.
(Continued)

FOREIGN PATENT DOCUMENTS

CN   1524766    9/2004
CN   1682402    10/2005
(Continued)

OTHER PUBLICATIONS

European Patent Office, "Communication Pursuant Article 94(3) EPC," issued in connection with European Patent Application No. 15720819.0, dated Nov. 21, 2017, 5 pages.
(Continued)

*Primary Examiner* — Dominic E Rego
(74) *Attorney, Agent, or Firm* — Hanley, Flight & Zimmerman

(57) ABSTRACT

A mechanically steered, horizontally polarized, directional antennae for aerial vehicles, such as UAVs. The antenna system can include a planar substrate with a horizontally polarized antenna embedded therein. A rotation member, on one end, can be attached to the planar substrate, and can extend from an external surface of the aerial vehicle. An actuator can be coupled to the rotation member to rotate the rotation member. A communication controller of the aerial vehicle can control the actuator to beam horizontally polarized radiofrequency (RF) waves to a target receiver or receive a wave front from a target transmitter.

20 Claims, 8 Drawing Sheets

Related U.S. Application Data continuation of application No. 14/660,215, filed on Mar. 17, 2015, now Pat. No. 10,069,200.

(60) Provisional application No. 61/955,613, filed on Mar. 19, 2014.

(51) Int. Cl.
| | |
|---|---|
| *H01Q 1/28* | (2006.01) |
| *H04B 7/185* | (2006.01) |
| *H01Q 1/12* | (2006.01) |
| *H01Q 3/04* | (2006.01) |
| *H01Q 3/08* | (2006.01) |
| *H01Q 19/30* | (2006.01) |
| *H01Q 1/40* | (2006.01) |

(52) U.S. Cl.
CPC ............... *H01Q 3/005* (2013.01); *H01Q 3/04* (2013.01); *H01Q 3/08* (2013.01); *H01Q 19/30* (2013.01); *H04B 7/18508* (2013.01); *B64C 2201/122* (2013.01); *H01Q 1/40* (2013.01)

(58) Field of Classification Search
CPC . H01Q 3/08; H01Q 19/30; H01Q 1/40; B64C 2201/122; H04B 7/18508
See application file for complete search history.

(56) References Cited

U.S. PATENT DOCUMENTS

| | | | |
|---|---|---|---|
| 6,208,307 B1 * | 3/2001 | Frisco ................. | H01Q 1/007 342/363 |
| 6,313,805 B1 | 11/2001 | Nishiyama | |
| 6,512,490 B1 | 1/2003 | Lee | |
| 8,244,174 B1 * | 8/2012 | Kong ................. | G01S 1/725 455/25 |
| 10,069,200 B2 | 9/2018 | Mack et al. | |
| 10,673,134 B2 | 6/2020 | Mack et al. | |
| 2004/0019415 A1 | 1/2004 | Hotta et al. | |
| 2005/0200533 A1 | 9/2005 | Brown et al. | |
| 2006/0158369 A1 | 7/2006 | Shinoda et al. | |
| 2007/0013590 A1 | 1/2007 | Shinkai | |
| 2007/0285327 A1 | 12/2007 | Paschen et al. | |
| 2008/0158078 A1 * | 7/2008 | Allen ................. | H01Q 1/084 343/757 |
| 2010/0045516 A1 * | 2/2010 | Nagahara ............. | G01S 19/22 342/357.63 |
| 2010/0104054 A1 | 4/2010 | Scott et al. | |
| 2011/0094995 A1 | 4/2011 | Yamazawa et al. | |
| 2011/0237315 A1 | 9/2011 | Seeor et al. | |
| 2012/0007787 A1 | 1/2012 | Schantz et al. | |
| 2012/0108080 A1 | 5/2012 | Akao et al. | |
| 2012/0177376 A1 | 7/2012 | Chang et al. | |
| 2012/0270169 A1 | 10/2012 | Yamaga | |
| 2013/0311893 A1 | 11/2013 | Dearman et al. | |
| 2013/0311935 A1 | 11/2013 | Setlur et al. | |
| 2014/0061469 A1 | 3/2014 | Hwang et al. | |
| 2014/0085152 A1 | 3/2014 | Klemmensen et al. | |
| 2016/0046387 A1 | 2/2016 | Frolov et al. | |
| 2017/0301987 A1 | 10/2017 | Mack et al. | |
| 2019/0006749 A1 | 1/2019 | Mack et al. | |

FOREIGN PATENT DOCUMENTS

| | | |
|---|---|---|
| EP | 0540899 | 5/1993 |
| JP | 2007324810 | 12/2007 |

OTHER PUBLICATIONS

Lee Deok-Jin and Mark, Richard, "Decentralized Control of Unmanned Aerial Robots for Wireless Airborne Communication Networks," International Journal of Advanced Robotic Systems, vol. 7, No. 3, 2010, 10 pages.

Guo, Y. and Prior, S.D., "Developement of Active Directional Antennae for use in Small UAVs," Aeronautics, Astronautics and Computational Engineering, Faculty of Engineering and the Environment, Highfield Campus, University of Southampton, Southampton S017 1BJ, United Kingdom, Oct. 26, 2013, 6 pages.

International Searching Authority, "International Search Report and Written Opinion," issued in connection with International Patent Application No. PCT/US2015/021265, dated Jul. 17, 2015, 21 pages.

Lee et al., "Wirelesss Communication Networks between Distributed Autonomous Systems Using Self-Tuning Extremum Control," AIAA InfoTech Aerospace Conference, Seattle, Washington, Apr. 6-9, 2009, 22 pages.

Volakis et al., "Antenna Engineering Handbook," The Aerospace Corporation, Dec. 31, 2007, 26 pages.

United States Patent and Trademark Office, "Notice of Allowance and Fee(s) Due," issued in connection with U.S. Appl. No. 14/660,215, dated May 7 2018, 18 pages.

United States Patent and Trademark Office, "Non-Final Office Action," issued in connection with U.S. Appl. No. 14/660,215, dated Nov. 30, 2017, 17 pages.

United States Patent and Trademark Office, "Requirement for Restriction/Election," issued in connection with U.S. Appl. No. 14/660,215, dated Sep. 20, 2017, 6 pages.

State of Israel Ministry of Justice the Patent Office, "Notification of Deficiencies," issued in connection with Israeli Patent Application No. 246399, dated Dec. 19, 2019, 6 pages.

Guo et al., "Development of Active Directional Antennae for Use in Small UAVs," Innovation, Communication and Engineering, 2013, 5 pages.

Lee et al., "Wireless Communication Networks Between Distributed Autonomous Systems Using Self-Tuning Extremum Control," In: AIAA nfotech@ Aerospace Conference and AIAA Unmanned . . . Unlimited Conference, 2009, 35 pages.

Lee et al., "Decentralized Control of Unmanned Aerial Robots for Wireless Airborne Communication Networks," International Journal of Advanced Robotic Systems, 2010, 10 pages.

United States Patent and Trademark Office, "Requirement for Restriction/Election," issued in connection with U.S. Appl. No. 16/059,489, dated Jun. 24, 2019, 8 pages.

United States Patent and Trademark Office, "Non-Final Office Action," issued in connection with U.S. Appl. No. 16/059,489, dated Sep. 4, 2019, 17 pages.

United States Patent and Trademark Office, "Notice of Allowance and Fee(s) Due," issued in connection with U.S. Appl. No. 16/059,489, dated Jan. 29, 2020, 19 pages.

United States Patent and Trademark Office, "Notice of Allowance and Fee(s) Due," issued in connection with U.S. Appl. No. 16/059,489, dated Mar. 25, 2020, 6 pages.

* cited by examiner

MECHANICALLY STEERED AND HORIZONTALLY POLARIZED ANTENNA FOR AERIAL VEHICLES, AND ASSOCIATED SYSTEMS AND METHODS

CROSS-REFERENCE TO RELATED APPLICATIONS

This application arises as a divisional application of U.S. patent application Ser. No. 16/059,489, filed on Aug. 9, 2018, which claims priority to U.S. patent application Ser. No. 14/660,215, filed on Mar. 17, 2015, which claims priority to U.S. Provisional Patent Application No. 61/955,613, filed on Mar. 19, 2014. The foregoing applications are entitled "MECHANICALLY STEERED AND HORIZONTALLY POLARIZED ANTENNA FOR AERIAL VEHICLES, AND ASSOCIATED SYSTEMS AND METHODS" and incorporated by reference herein in their entireties.

TECHNICAL FIELD

At least one embodiment of the present technology relates generally to radio frequency communication systems, and in particular to communication systems for unmanned aerial vehicles (UAVs).

BACKGROUND

UAVs are aerial vehicles that do not carry a human operator and use aerodynamic forces to provide vehicle lift. UAVs can have a wide variety of shapes, sizes, configurations, and characteristics. UAVs can fly autonomously or can be piloted remotely. For example, using known communications systems, UAVs can be controlled from a remote location, or fly autonomously based on pre-programmed flight plans using dynamic automation systems, or a combination of both. Autonomous systems can allow the aerial vehicle to fly outside a pre-programmed flight plan using on-board smart systems or artificial intelligence to adapt to unplanned changes in the vehicle's course and/or to handle broad instructions (e.g., fly from point A to point B with maximum fuel economy and no collisions).

One application of UAVs is reconnaissance for military or non-military operations. Reconnaissance UAVs are able to transmit data, such as video data, to remote locations and/or to each other. These reconnaissance UAVs can be rather small to avoid detection and for cost effectiveness. UAVs may have fixed wings or one or more rotors. Modern UAVs may travel across large distances. Hence, the communication systems for the UAVs need to be able to support long-distance communication that is beyond a small local region, including avionic control communication and surveillance data transfer.

Conventional high gain antennae (e.g., electronically steered antennae) require a large vertical cross section in order to achieve 360° of coverage. Such a large vertical cross section can adversely impact the aerodynamic performance of the UAVs by creating unwanted drag. In addition, these antennae can be heavy, complex, and expensive. This presents a size, weight, and power (SWAP) problem for small airborne platforms like Tier 2 UAVs. Accordingly, there remains a need in the art for improved UAV communications.

Figure 1:
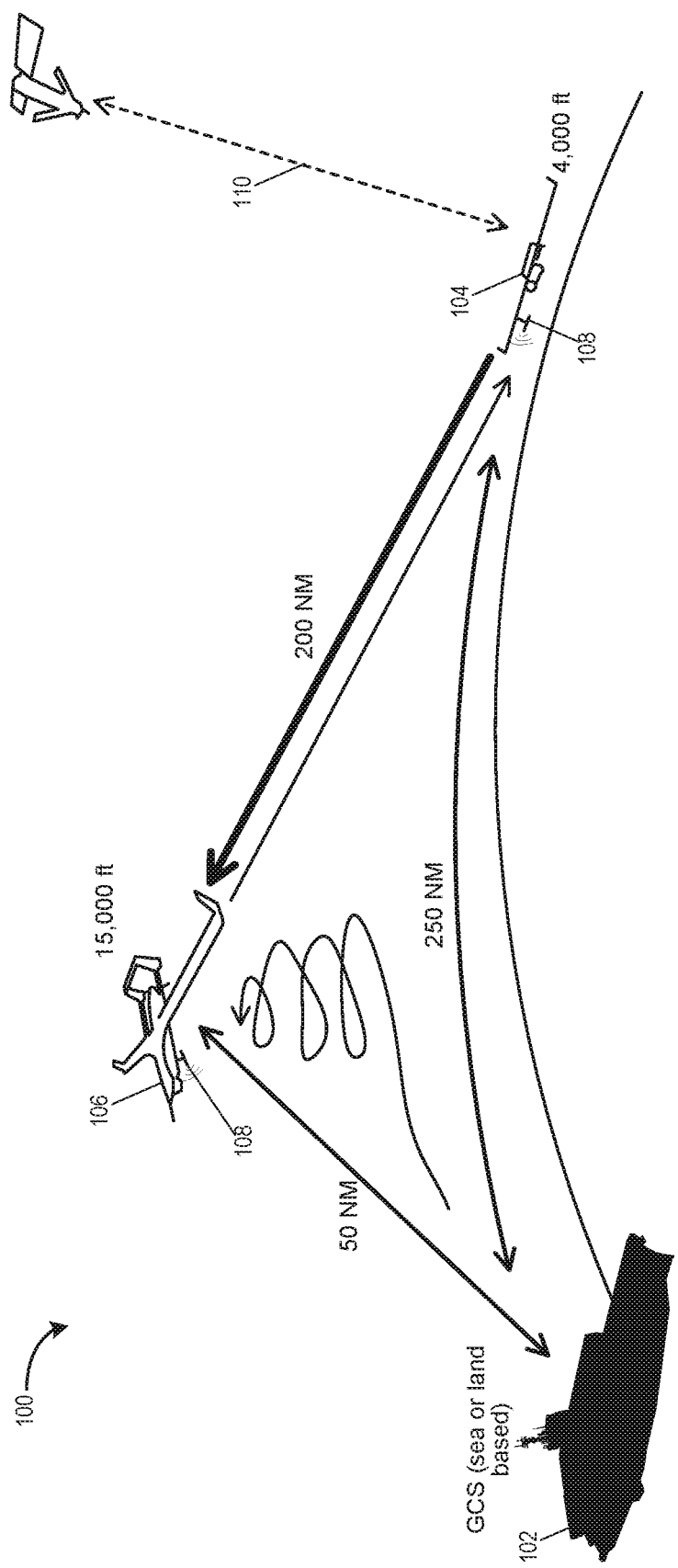
FIG. 1 is a diagram illustrating a communication system for aerial vehicles, in accordance with several embodiments of the presently disclosed technology.

The Figures depict various embodiments of the present technology for purposes of illustration only. One skilled in the art will readily recognize from the following discussion that other embodiments of the structures and methods illustrated herein may be employed without departing from the principles of the technology described herein.

DETAILED DESCRIPTION

Embodiments of the present technology are directed to mechanically steered, horizontally polarized, directional antennae with very small vertical cross sections. The directional antennae can be part of an antenna system for aerial vehicles, such as unmanned aerial vehicles (UAVs). In other embodiments, the disclosed technology can be practiced in accordance with other embodiments. Several details describing structures or processes that are well-known and often associated with UAV antennae, but that may unnecessarily obscure some aspects of the present technology are not set forth in the following description for purposes of clarity. Moreover, although the following disclosure sets forth several embodiments of different aspects of the present technology, several other embodiments of the technology can have different configurations and/or different components than those described in this section. As such, the present technology may have other embodiments with additional elements and/or without several of the elements described below with reference to FIGS. 1-6.

In this disclosure, "horizontal" refers to a plane generally parallel to a surface that is tangent to the earth where an aerial vehicle is in flight, such as the plane parallel to a bottom plane of the aerial vehicle hull when the aerial vehicle is in steady flight. "Vertical" refers to a plane generally orthogonal to the horizontal plane. A "directional" antenna refers generally to an antenna that, when transmitting, generates a radio frequency (RF) wave front that is narrow in both the horizontal plane and the vertical plane. In some embodiments, the same antenna is used to both receive and transmit RF signals. In some embodiments, a different antenna can be used to receive RF signals than is used to transmit RF signals. The different antenna can have the same directional gain profile as the antenna used for transmission. Narrow can mean that the beam angle of the RF wave front is less than 90° (e.g., +/−45°) or less than 60° (e.g., +/−30°). Unless stated otherwise, as used herein, the term "generally" when applied to terms expressed in, or susceptible to being expressed in numerical terms, means within 10%.

Examples of the disclosed antennae include a single dipole antenna and any other suitable type of periodic antenna that is horizontally polarized. For example, suitable antenna types include at least Yagi-Uda antennae, log periodic antennae, other periodic antennae, and end-fire linear arrays of dipoles. The antenna may be a planar end-fire antenna. The radiating elements of the antenna can be embedded within or carried by a thin planar substrate. The thin planar substrate can have a shape that is rotationally symmetric along at least one axis. For example, the rotationally symmetric shape can be a circular disk shape or a saucer disk shape. In some embodiments, the shape can be approximately rotationally symmetric, such as a circular shape with saw tooth pattern or ripple pattern on its circumference. The rotational symmetry of the disk enables it to have 360° of RF coverage in its polarization plane (via mechanical rotation), without having different aerodynamic characteristics at different rotation angles. More particularly, when the thin planar substrate is exposed to the airstream outside the air vehicle, the aerodynamic properties (e.g., drag) of the substrate and the antenna it carries, will remain generally constant as the substrate is rotated. In particular embodiments, the thin circular disk substrate can be a printed circuit board (PCB). The antenna may be manufactured as printed conductive circuitry within or on the PCB. The geometry of the antenna can create horizontal polarization when the antenna is transmitting.

An antenna system that includes the antenna can mechanically rotate the thin planar substrate and hence the antenna. In some embodiments, the antenna system can rotate the antenna around the center of the thin planar substrate or the center of the antenna. In other embodiments, the antenna system can rotate the antenna around another point on the planar surface of the thin planar substrate. When rotating, the antenna can provide 360° of coverage in azimuth. Various mechanisms can be utilized to rotate the antenna and the thin planar substrate. For example, one mechanism can include a servo shaft or other rotation member that carries the substrate and is connected to a rotary actuator or servo, so that rotating the servo shaft rotates the thin planar substrate and the antenna.

Embodiments of the disclosed antenna system can be advantageous for one or more of a variety of reasons. For example, the small vertical cross section of the substrate can improve the aerodynamic performance and the high gain (at long ranges) of the antenna. Embodiments of this antenna system can enable an extremely long-range air-to-ground or air-to-air data link, thus bypassing line-of-sight (LOS) limitations. This communication technology can be used with a relay aircraft and/or a military intelligence, surveillance, and reconnaissance (ISR) aircraft. For example, the antenna can provide a range of 400 nautical miles (NM) from a ground control station (GCS) via a relay aircraft. Accordingly, the antenna system can provide a low-drag beyond line-of-sight (BLOS) solution to communication issues presented by conventional technologies. The present BLOS solution may be superior to conventional communication systems for air vehicles, including satellite communications (SATCOM), in terms of cost, time on station, payload capacity, ship compatibility, coverage and/or data link availability, data rate, and/or latency. The communication technology can be used for various applications, including low-cost, long endurance UAVs.

The horizontally polarized directional antenna has significantly more gain (within the elevation angle range of the antenna) than conventional communication systems installed on UAVs. Hence, the directional antenna provides a low cost, high performance BLOS solution for these Tier 2, low cost, aircraft. For example, a typical operational range of 50 NM for a conventional LOS system can be extended up to 400 NM using BLOS systems in accordance with the present technology.

In sum, embodiments of the present technology include an antenna that has a significantly reduced cross section and weight when compared to conventional state-of-the art technologies with the same antenna gain. The presently disclosed antenna can provide 360° of coverage in azimuth using horizontal polarization. Because of the antenna's low cross section and aerodynamically improved (e.g., optimized) profile, it supports extremely large air-to-air data link ranges on small UAVs. In still further embodiments, this antenna can establish an air-to-air data link for locating target aircraft by mechanically steering the antenna in a 360° circle to identify a signal source. The antenna can establish an air-to-ground data link by generating a beam spread elevation angle of ±20° to ±30°. The antenna system may further include a tilting device to increase signal coverage in the vertical plane.

Several embodiments of the disclosed technology may take the form of computer-executable instructions, including routines executed by a programmable computer or controller. Those skilled in the relevant art will appreciate that the technology can be practiced on computer or controller systems other than those shown and described below. The technology can be embodied in a special-purpose computer, controller, or data processor that is specifically programmed, configured or constructed to perform one or more of the computer-executable instructions described below. Accordingly, the terms "computer" and "controller" as generally used herein include a suitable data processor and can include internet appliances and hand-held devices, including palmtop computers, wearable computers, cellular or mobile phones, multi-processor systems, processor-based or programmable consumer electronics, network computers, laptop computers, mini-computers and the like. Information handled by these computers can be presented at any suitable display medium, including a liquid crystal display (LCD). As is known in the art, these computers and controllers commonly have various processors, memories (e.g., non-transitory computer-readable media), input/output devices, etc.

The present technology can also be practiced in distributed environments, where tasks or modules are performed by remote processing devices that are linked through a communications network. In a distributed computing environment, program modules or subroutines may be located in local and remote memory storage devices. Aspects of the technology described below may be stored or distributed on computer-readable media, including magnetic or optically readable or removable computer discs, as well as distributed electronically over networks. Data structures and transmissions of data particular to aspects of the technology are also encompassed within the scope of the present technology.

FIG. 1 is a diagram illustrating a communication system 100 for aerial vehicles, configured in accordance with embodiments of the present technology. The communication system 100 can be for communication between or among a ground control station (GCS) 102, a first aerial vehicle 104 (e.g., a UAV or other ISR aircraft), and/or a second aerial vehicle 106 (e.g., a relay aircraft). The first aerial vehicle 104 can include one or more mechanically steered antenna systems 108 to facilitate communication between the first aerial vehicle 104 and the GCS 102. For example, the mechanically steered antenna system 108 can facilitate a control uplink from the GCS 102 to the first aerial vehicle 104. A separate mechanically steered antenna system 108 can facilitate a control downlink from the first aerial vehicle 104 to the GCS 102. In another embodiment, the same mechanically steered antenna system 108 can facilitate both the control downlink and the control uplink.

At least one of the mechanically steered antenna systems 108 can facilitate a surveillance downlink from the first aerial vehicle 104 to the GCS 102. For example, the surveillance downlink can include video surveillance data, photographic image data, radio frequency data, weather data, and/or other suitable sensor data recorded inflight. In some embodiments, the mechanically steered antenna system 108 for the surveillance downlink is separate from the mechanically steered antenna system 108 for either the control downlink or the control uplink. In other embodiments, the mechanically steered antenna system 108 for the surveillance downlink is the same antenna system for the control downlink and/or the control uplink.

The communication system 100 can include a backup communication channel 110, such as a satellite communication channel. For example, the backup communication channel 110 can be an Iridium satellite communication network. In certain embodiments, the backup communication channel 110 is used only when the mechanically steered antenna systems 108 are unable to establish a connection with the GCS.

One or more of the mechanically steered antenna systems 108 can also facilitate communication between the first aerial vehicle 104 and the second aerial vehicle 106. For example, the second aerial vehicle 106 can also include one or more of the mechanically steered antenna systems 108. The second aerial vehicle 106 can relay control data from the GCS 102 to the first aerial vehicle 104 and vice versa from the first aerial vehicle 104 to the GCS 102. The second aerial vehicle 106 can relay surveillance data from the first aerial vehicle 104 to the GCS 102 as well. In some embodiments, the first aerial vehicle 104 and the second aerial vehicle 106 operate as mutual relays for each other.

In the illustrated example, the first aerial vehicle 104 is an ISR aircraft commanded to hover or remain on station at 4000 feet. The second aerial vehicle 106 is a relay aircraft initially commanded to hover or remain on station at 4000 feet as well. The mechanically steered antenna systems 108 of both aerial vehicles 104 and 106 can establish air-to-air BLOS communication with each other. The GCS 102 can command the first aerial vehicle 104 to fly to a farther distance, such as 250 NM, away from the GCS 102. The second aerial vehicle 106 can provide a relay communication link between the GCS 102 and the first aerial vehicle 104. In particular, the second aerial vehicle 106 can increase its altitude above ground level (e.g., to 10,000 ft.) to maintain communication with both the GCS 102 and the first aerial vehicle 104 via its one or more mechanically steered antenna systems 108.

Figure 2A:
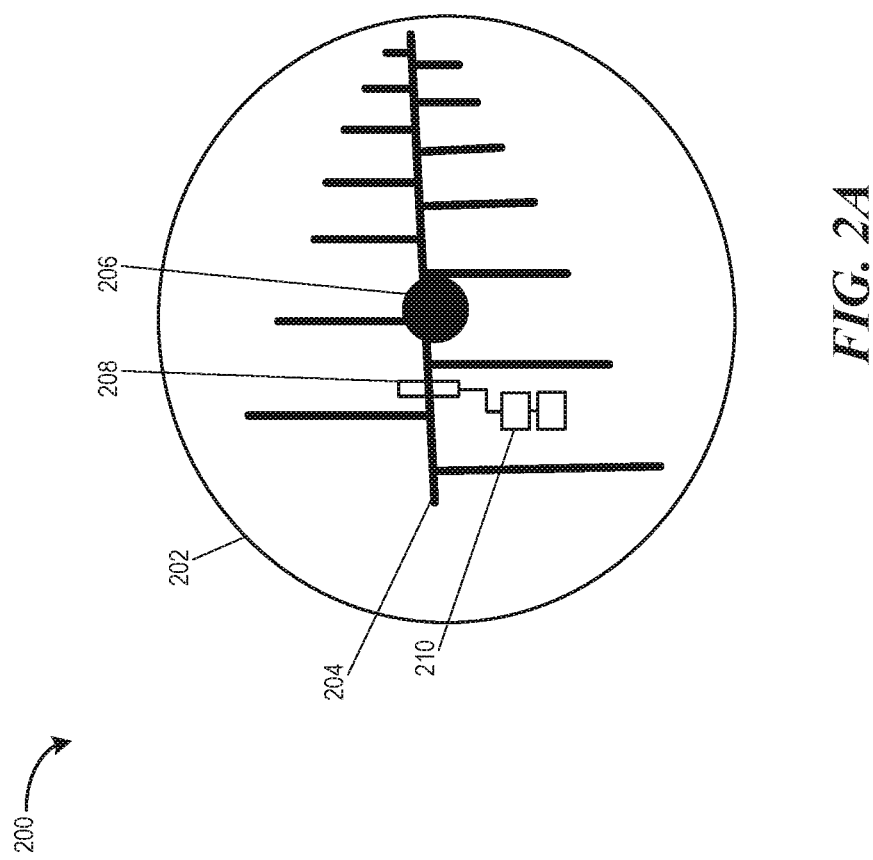
FIG. 2A is a top view of a representative antenna member for an antenna system of an aerial vehicle, in accordance with various embodiments of the presently disclosed technology.

FIG. 2A is a top view of a representative antenna package 200 for an antenna system of an aerial vehicle, in accordance with various embodiments of the present technology. The antenna package 200 can be an antenna member encapsulated within a non-conductive material. The antenna package 200 may be part of the antenna system 108 of FIG. 1. The antenna package 200 can include a substrate 202 and one or more conductive elements 204 (e.g., conductive rods or plates). For example, the substrate 202 can be a PCB that includes conductive material for the antenna, and a ceramic or other non-conductive material as a support structure. The substrate 202 may be shaped as a circular disk or other rotationally symmetric shape, such as saucer shape or a spherical shape, to reduce the aerodynamic impact of mechanically steering the antenna package 200. The substrate 202 may have a height or thickness in the vertical plane that is significantly less than its extent in the horizontal plane (e.g., length, width, or diameter). For example, the diameter of the substrate 202 can be 7 inches and the thickness of the substrate 202 may be less than half an inch. The substrate 202 can have a constant height or a variable height that maintains a rotationally symmetric shape around a vertical axis. In some embodiments, the substrate 202 has a planar top surface and a planar bottom surface with a rectangular vertical profile. In those embodiments, the substrate 202 may have rounded edges to improve the aerodynamic performance of the antenna package 200. In other embodiments, the substrate 202 has an elongated elliptical shape (e.g., from a side view, a top/bottom view, or both the side view and the top/bottom view).

The conductive elements 204 can be manufactured via a variety of suitable techniques, including circuit printing technology; lithographic etching and/or patterning, other integrated circuit fabrication techniques. The conductive elements 204 can form various types of horizontally polarized antennae, such as a log periodic antenna, a Yagi-Uda antenna, a single dipole antenna, and/or other types of periodic or linearly polarized antennae. In some embodiments, the conductive elements 204 have the same thickness. In other embodiments, the conductive elements 204 have a graduated thickness profile to increase additional vertical gain. In some embodiments, the conductive elements 204 are printed on a top flat surface of the substrate 202. In other embodiments, the conductive elements 204 are embedded within the substrate 202, e.g., with a small angular tilt relative to the top flat surface of the substrate 202. This small angular tilt can facilitate air-to-ground communication even when the ground control station is beneath the aerial vehicle and the antenna package 200 is mounted to the aerial vehicle at a fixed angle. In some embodiments, the conductive elements 204 while embedded in the substrate 202 are at least partially exposed at one or more surfaces of the substrate 202. In other embodiments, the conductive elements 204 are completely enclosed within the substrate 202.

The antenna package 200 can include an attachment point 206 at a top/bottom surface of the antenna package 200. The top/bottom surface may be the larger surface as compared to one or more side surfaces which have a smaller height profile. In some embodiments, the top/bottom surface may be slightly curved or grooved to improve aerodynamic performance. The attachment point 206 can be configured to attach to a servo shaft or other rotation member. In some embodiments, the servo shaft is retractable. The attachment point 206 may be positioned at the center of the substrate 202 enabling the servo shaft to symmetrically rotate the substrate when the servo shaft is attached. In other embodiments, the attachment point 206 can be off-center (e.g., at a center of gravity instead of a geometric center of a top or bottom surface).

The antenna package 200 can also include an electrical interface 208 to couple with a communication system of the aerial vehicle that carries the antenna package 200. The electrical interface 208 can be co-located with the attachment point 206 or at a different point that is in electrical contact with at least one of the conductive elements 204. For example, the electrical interface 208 may be detachably connected to electrical cables or wires extending from the aerial vehicle. The antenna package 200 can include slip rings and/or other suitable connections that allow the substrate 202 to rotate without disrupting electrical connections between electrical elements on the substrate 202 and electrical elements off the substrate 202.

In particular embodiments, the antenna package 200 may also include other passive or active circuit elements 210. For example, the antenna package 200 may include an amplifier. The amplifier can actively amplify electrical signals received through the electrical interface 208 before transmitting the electrical signals via the conductive elements 204. The amplifier can also amplify RF signals received through the air via the conductive elements 204 before delivering the RF signals through the electrical interface 208 (e.g., to the communication system). As another example, the antenna package 200 may further include one or more analog circuit elements, such as a receiver, a transmitter, a transceiver, a signal filter, or any combination thereof. These analog circuit elements can be embedded or integrated within the substrate 202 or printed on the substrate 202 (e.g., in the case that the substrate 202 is a PCB).

Figure 2B:
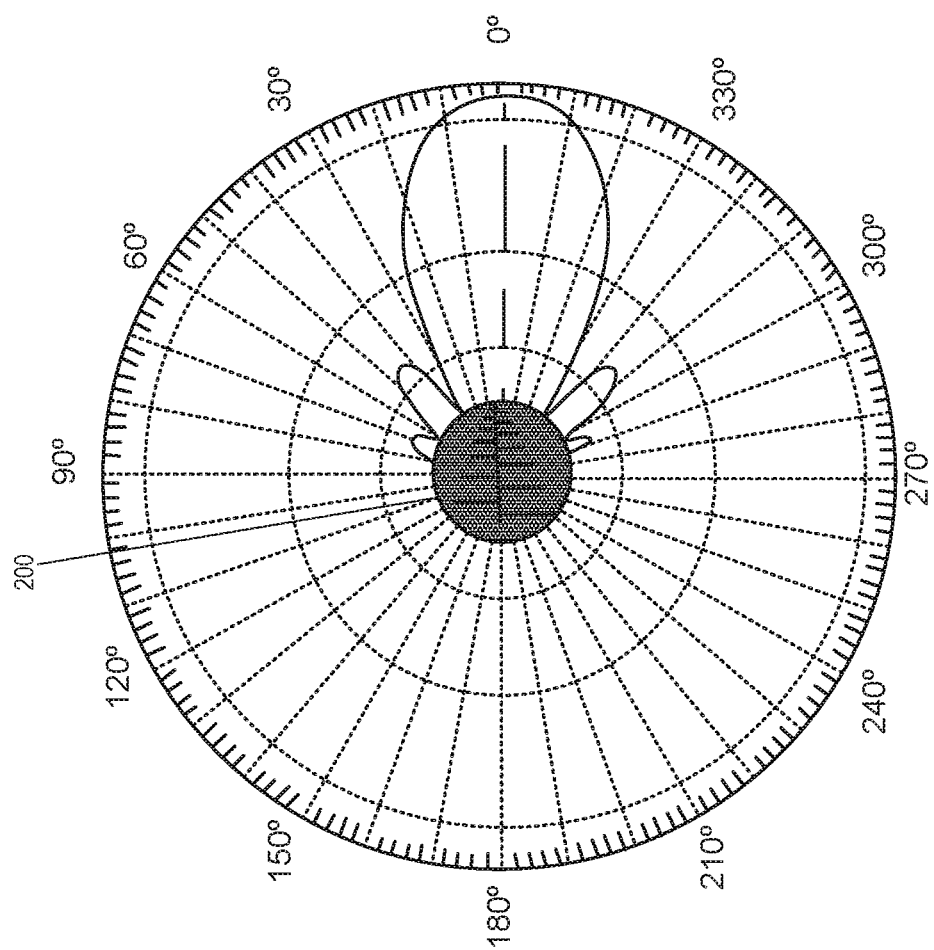
FIG. 2B is a schematic top view of the representative antenna member of FIG. 2A along with corresponding gain values, in accordance with embodiments of the presently disclosed technology.

FIG. 2B is a schematic top view of the representative antenna package 200 of FIG. 2A, along with corresponding gain values in accordance with embodiments of the present technology. This antenna gain chart illustrates the expected gain of the antenna package 200 along azimuth angles from 0° to 360°. For example, the antenna package 200 can have a horizontal beam width of approximately 20° at half power (e.g., −3 dB) beam width. As shown, the antenna package 200 implements a directional antenna having an operational gain level within ±20° in the azimuth from the direction that the antenna package 200 is pointing (e.g., 0°). The gain can drop to approximately zero beyond ±30° in the azimuth.

FIG. 2B illustrates a representative gain profile. In a representative embodiment, the rings in FIG. 2B are scaled logarithmically. The outermost ring (solid line) can be 0 dB (e.g., with respect to maximum directivity or gain), followed by a dashed line ring at −3 dB, a dashed line ring at −10 dB, and an innermost ring (dashed line) at −20 dB. In other embodiments, the rings can have other values.

Figure 2C:
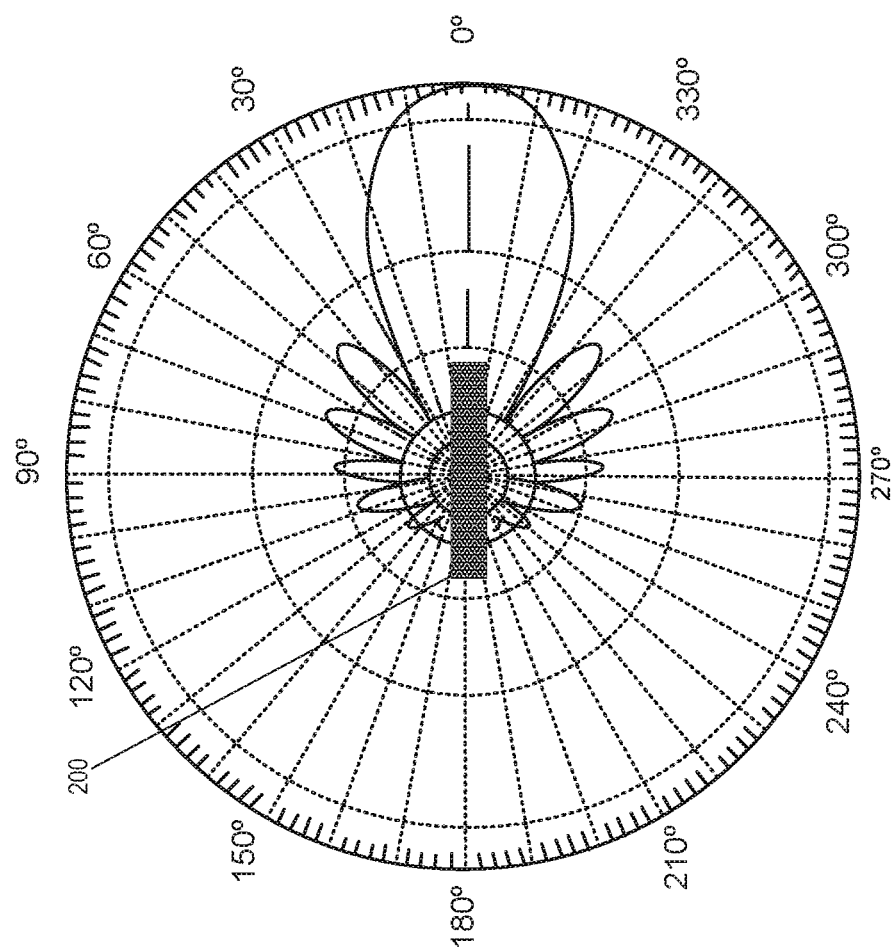
FIG. 2C is a schematic side view of the representative antenna member of FIG. 2A along with corresponding gain values, in accordance with embodiments of the presently disclosed technology.

FIG. 2C is a schematic side view of the representative antenna package 200 of FIG. 2A, along with corresponding gain values in accordance with embodiments of the present technology. This antenna gain chart illustrates the expected gain of the antenna package 200 as a function elevation angles from 0° to 360°. For example, the representative antenna package 200 can have an elevation beam width of approximately 30° at −3 dB (e.g., 3 dB beam width). As shown, the antenna package 200 implements a horizontally polarized antenna having, an operational gain level within ±20° of elevation angle from the direction that the antenna package 200 is pointing. The can gain drop to substantially zero beyond plus or minus 30° elevation angle from the direction that the antenna package 200 is pointing. For example, these beam widths of ±20° or ±30° of elevation angle can facilitate air-to-ground communication without mechanically tilting the antenna package 200.

FIG. 2C illustrates an example of a gain profile for an antenna package. In a representative embodiment, the rings in FIG. 2C are scaled logarithmically. The outermost ring (solid line) can be 0 dB (e.g., with respect to maximum directivity or gain), followed by a dashed line ring at −3 dB, a dashed line ring at −10 dB, and an innermost ring (dashed line) at −20 dB. In other embodiments, the rings can have other values.

However, even with the ±30° of beam elevation angle, when the aerial vehicle is directly over a GCS that it needs to communicate with, the horizontally polarized wave front of the RF signal from the antenna package 200 may not be able to reach the intended target. Communication can be established in such a scenario in a variety of ways. For example, the antenna system of the aerial vehicle can have a mechanical device to tilt the antenna member. As another example, the conductive elements 204 may be formed with a slight angular tilt relative to a top flat surface of the substrate 202. By rotating the antenna, it can be pointed downwardly toward the GCS. In yet another example, a communication system of the aerial vehicle can automatically negotiate with an avionics system of the aerial vehicle to intentionally bank the aerial vehicle in flight to point the conductive elements 204 at a downward angle toward the ground. In other embodiments, the communication system can monitor the bank angle of the aerial vehicle and/or attempt to communicate with the GCS when the aerial vehicle banks to a sufficient downward angle.

The directionality (e.g., limited beam azimuth angles) and the horizontal polarization (e.g., limited beam elevation angles) of the antenna package 200 can be advantageous from a signal security perspective by spatially limiting the wave front profile of an RF signal transmitted from the antenna package 200. Because of the limited elevation and azimuth angles of the wave front, it is much harder to intercept communications sent from the aerial vehicle. This facilitates spatially discrete communications to and from the aerial vehicle. Because the gain profile is directionally concentrated, the antenna package 200 is also able to extend the range of communication. Given the same power limitations, an antenna with a directionally concentrated gain profile can concentrate more power in one direction and thus extend the range of the RF signal transmitted from the antenna package 200. The spatially limited wave front profile can be further advantageous by enabling frequency reuse or multi-use. Directional RF signals are less likely to interfere with each other because of the decreased likelihood of spatial overlap. Accordingly, the directional RF signals of similar frequencies can be used within the same region.

Figure 3:
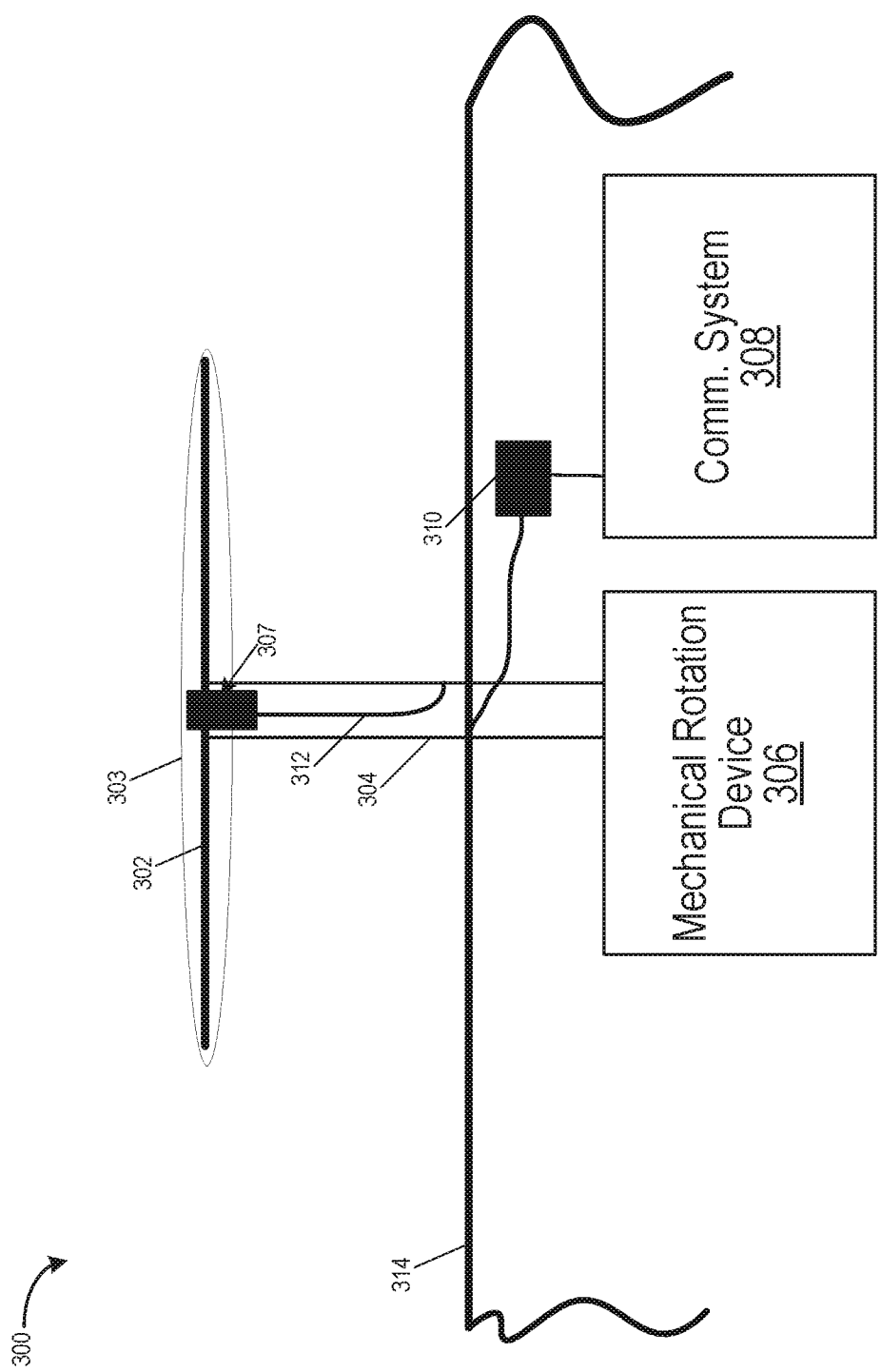
FIG. 3 is a partially schematic side view of an antenna system of an aerial vehicle, in accordance with embodiments of the presently disclosed technology.

FIG. 3 is a side view diagram of an antenna system 300 of an aerial vehicle, configured in accordance with embodiments of the present technology. The antenna system 300 includes an antenna member 302, such as the conductive elements 204 within the antenna package 200 of FIG. 2. Optionally, the antenna member 302 can be enclosed by an encapsulant 303, e.g., to improve the aerodynamic profile of the antenna member. In other embodiments, the antenna member 302 can be enclosed by a housing (not shown). The encapsulant 303 or the housing can have a side view profile that is symmetrically shaped (e.g., elliptically shaped). However, in several embodiments, the antenna system 300 does not include an encapsulant or a shield or housing, and can accordingly be simpler and cheaper than antenna systems that include such elements. The antenna member 302 is attached (e.g., permanently or detachably) to a rotation member, e.g., a rotary shaft 304. In some embodiments, the rotary shaft 304 is retractable. A mechanical rotation device 306 drives the rotary shaft 304. The mechanical rotation device 306, for example, can be a servo or a motor.

In some embodiments, the mechanical rotation device 306 can tilt the antenna member 302 by tilting the rotary shaft 304. In other embodiments, the mechanical rotation device 306 (or a separate device) can tilt the antenna member 302 without tilting the rotary shaft 304, e.g., by tilting the antenna member 302 relative to its attachment point 307.

In some embodiments, a communication system 308 of the aerial vehicle controls the mechanical rotation device 306. The communication system 308 can include a communication controller. For example, the communication system 308 can periodically rotate the rotary shaft 304 (and thus the antenna member 302) over a range of 360° via the mechanical rotation device 306 in order to identify an incoming RF signal from either a GCS or another aircraft. When transmitting a signal, the communication system 308 can rotate the rotary shaft 304 to point the antenna member 302 toward a known target receiver (e.g., a GCS or another aircraft). The communication system 308 can rotate the rotary shaft 304 based on a remote command from the operator. In other embodiments, the communication system 308 can rotate the rotary shaft 304 automatically based on a known location of the target receiver (e.g., identified previously by rotating the antenna member 302 over a range of 360° to trace the direction of highest signal strength). In the case that the aerial vehicle is a UAV, the operator can establish manual control of the mechanical rotation device 306 after at least one of the antenna systems on the aerial vehicle has established a connection with the operator. In general, the antenna member 302 does not rotate continuously in the same direction, but instead rotates slowly as the UAV changes position relative to the target location with which it is communicating, and/or oscillates to keep the antenna pointed in the right direction as the UAV (and/or the target location) travel.

The communication system 308 is electrically coupled to conductive elements within the antenna member 302 through an RF connector 310. The RF connector 310 may be coupled to an interconnect 312, such as a wire, a cable, and/or other forms of electrical interconnection. The interconnect 312 may be exposed outside of the rotary shaft 304 as illustrated, or can be placed within the rotary shaft 304. In some embodiments, the interconnect 312 can be wrapped around the rotary shaft 304. The system can include slip rings and/or other features to transition the interconnect 312 (e.g., electrical lines) from the hull 314 of the aircraft to the rotary shaft 304. The RF connector 310 may also include an amplifier, a receiver, a transmitter, a transceiver, or any combination thereof. The communication system 308 can transmit or receive RF signals through the antenna member 302 via the RF connector 310. The antenna system 300 can be either an active (i.e., electrically driven by a power source) or a passive antenna system. For example, the antenna member 302 can be actively driven by a power source in the communication system 308 to radiate a horizontally polarized and directional RF signal. In other embodiments, the antenna member 302 is mechanically rotated to capture RF signal in air and subsequently route (i.e., passively route) the RF signal through the interconnect 312 to the communication system 308.

The hull 314 of the aerial vehicle is shown in FIG. 3 to illustrate a representative mounting position for the antenna system 300. For example, the antenna system 300 can be mounted from, to, or relative to a top or a bottom surface of the aerial vehicle, such as a top or a bottom surface of a wing tip, a fuselage, and/or an aircraft nose. In the illustrated example, the hull 314 can enclose the communication system 308 and the mechanical rotation device 306. In other examples, the communication system 308 and/or the mechanical rotation device 306 can be exposed outside the hull 314. The antenna member 302 can be mounted a short distance away from the hull 314 such that the thin profile of the antenna member 302 extends parallel to the ground surface in steady flight of the aerial vehicle.

Figure 4:
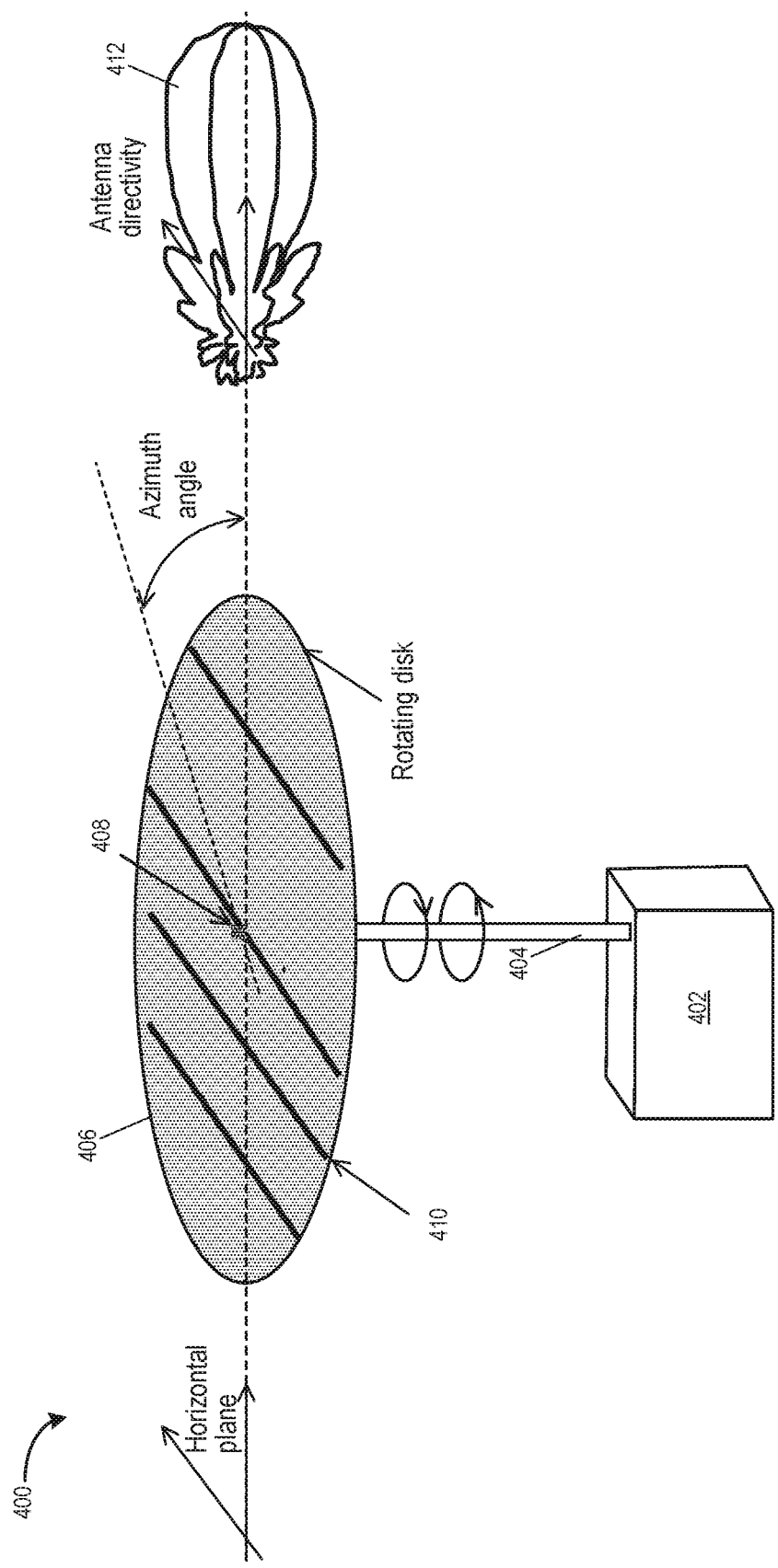
FIG. 4 is a partially schematic top perspective diagram illustrating a process of directing an antenna system of an aerial vehicle, in accordance with embodiments of the presently disclosed technology.

FIG. 4 is a partially schematic perspective diagram illustrating a process for directing an antenna system 400 of an aerial vehicle, in accordance with embodiments of the present technology. For example, the antenna system 400 can be the antenna system 300 of FIG. 3. A servo 402 can rotate a shaft 404 clockwise and/or counter-clockwise. Consequently, the shaft 404 rotates an antenna member 406 (e.g., a disk-shaped antenna member) in a horizontal plane. The antenna member 406 can rotate ±180° toward a given orientation, so as to cover 360°. In other embodiments, the antenna member 406 can rotate through any number of consecutive 360° cycles. The antenna member 406 can rotate around a pivot point 408. The pivot point 408 can be at a center of the antenna member 406 (e.g., a disk-shaped member). In some embodiments, a mechanical device (not shown) is coupled to the antenna (e.g., at the pivot point 408) to tilt the antenna member 406. In other embodiments, the antenna member 406 is coupled to the shaft 404 at a fixed angle (e.g., at an orthogonal angle). Antenna elements 410 of the antenna member 406 can generate a horizontally polarized wave front 412. The wave front 412 can be directional, e.g., limited to be within a selected azimuth angle.

Embodiments of the disclosed technology include a method of operating the antenna system 400 to locate a ground control station without a global positioning system (GPS). A communication system, such as the communication system 308 of FIG. 3, of the aerial vehicle can mechanically rotate the antenna member 406 around the pivot point 408. The communication system can monitor for RF signals received through the antenna member 406. Then the communication system can identify an azimuth angle with the highest signal strength and use the azimuth angle and the elevation of the aerial vehicle (e.g., elevation of the communication/antenna system) to determine (e.g., compute) the location of the GCS. This arrangement can be used if the GPS system (which may be used under most and/or normal circumstances) is not available. In this case, the aerial vehicle with the disclosed communication system can "home-in" on an RF beacon signal transmitted from a GCS, e.g., to locate itself after becoming lost.

Figure 5A:
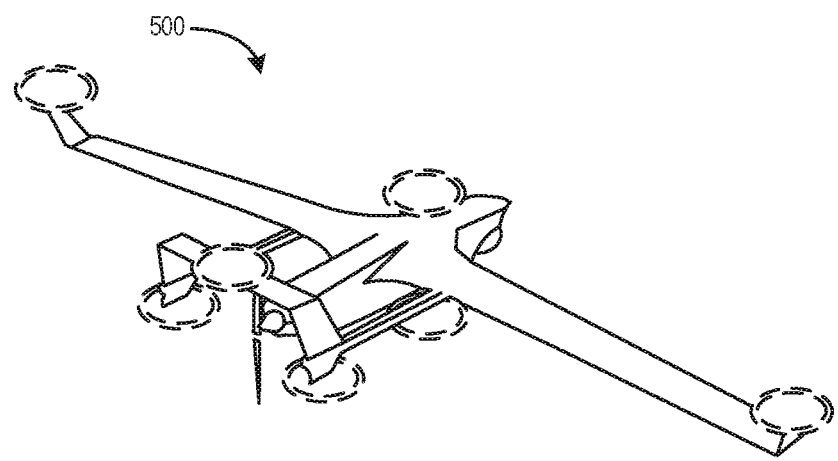
FIG. 5A is a partially schematic top perspective view of a first example of an aerial vehicle illustrating potential positions for mounting one or more antenna systems, in accordance with embodiments of the presently disclosed technology.

FIG. 5A is a perspective view of a first example of an aerial vehicle 500 illustrating potential positions (shown as dashed circles) for mounting one or more antenna systems, in accordance with embodiments of the present technology. The illustrated example of the aerial vehicle 500 is a twin-boom UAV. The one or more antenna systems can be mounted on either the top side or the bottom side of the aerial vehicle 500. The antenna systems can be the antenna system 300 of FIG. 3 or the antenna system 400 of FIG. 4. Representative positions to place the antenna systems on the aerial vehicle 500 include locations above and/or under the wing tips, above and/or under the winglets, above and/or under the body (e.g., cargo bay or the fuselage), above and/or under the head/nose, above and/or under the tail (e.g., horizontal or vertical stabilizer), and above and/or under each of the twin booms.

Figure 5B:
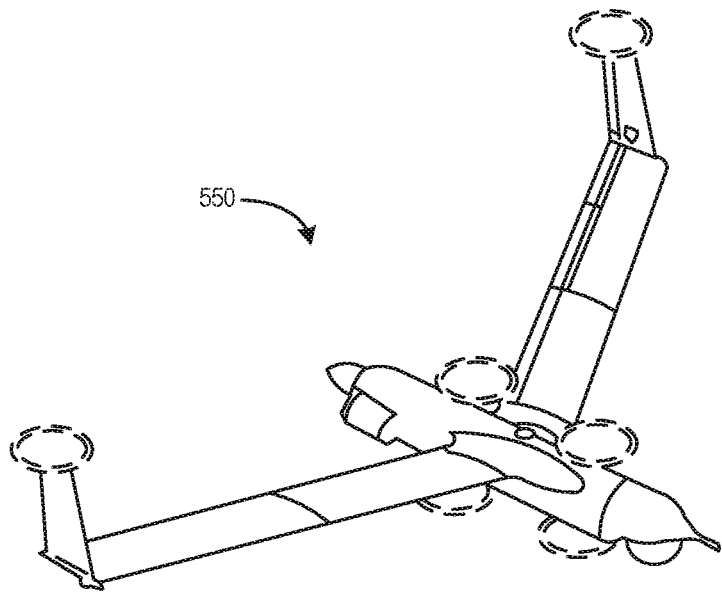
FIG. 5B is a partially schematic top perspective view of a second example of an aerial vehicle illustrating potential positions for mounting one or more antenna systems, in accordance with embodiments of the presently disclosed technology.

FIG. 5B is a perspective view diagram of a second example of an aerial vehicle 550 illustrating representative positions (shown as dashed circles) for mounting one or more antenna systems, in accordance with embodiments of the present technology. The illustrated example of the aerial vehicle 550 is a fixed wing UAV. Similar to the aerial vehicle 500, representative locations for the antenna systems can include above or under the wing tips, above or under the winglets, above or under the body, above or under the head/nose, and above or under the tail.

The aerial vehicles shown in FIGS. 5A and 5B can each include at least one antenna system. When an antenna system is placed asymmetrically on the aerial vehicle (e.g., on only one wingtip), another antenna system can be positioned to remove the asymmetry (e.g., on only the opposite wingtip). The aerial vehicles can have separate antenna systems for transmitting data and for receiving data. The aerial vehicles can have separate antenna systems for air-to-air communication and air-to-ground communication. The aerial vehicles can have separate antenna systems for aircraft control and for surveillance data transmission. For example, a UAV can have three antenna systems, one for control data uplink, one for control data downlink, and one for surveillance data uplink. The aerial vehicles can also have separate antenna systems with different fixed tilt angles. For example, this can be achieved by mounting the antenna member at a tilted angle or by embedding conductive elements within the antenna members at a tilted angle. For example, the aerial vehicles can have an antenna system that is generally horizontally polarized (e.g., for air-to-air communication) and an antenna system that is partially horizontally polarized with a slight tilt (e.g., for air-to-ground communication).

Figure 6:
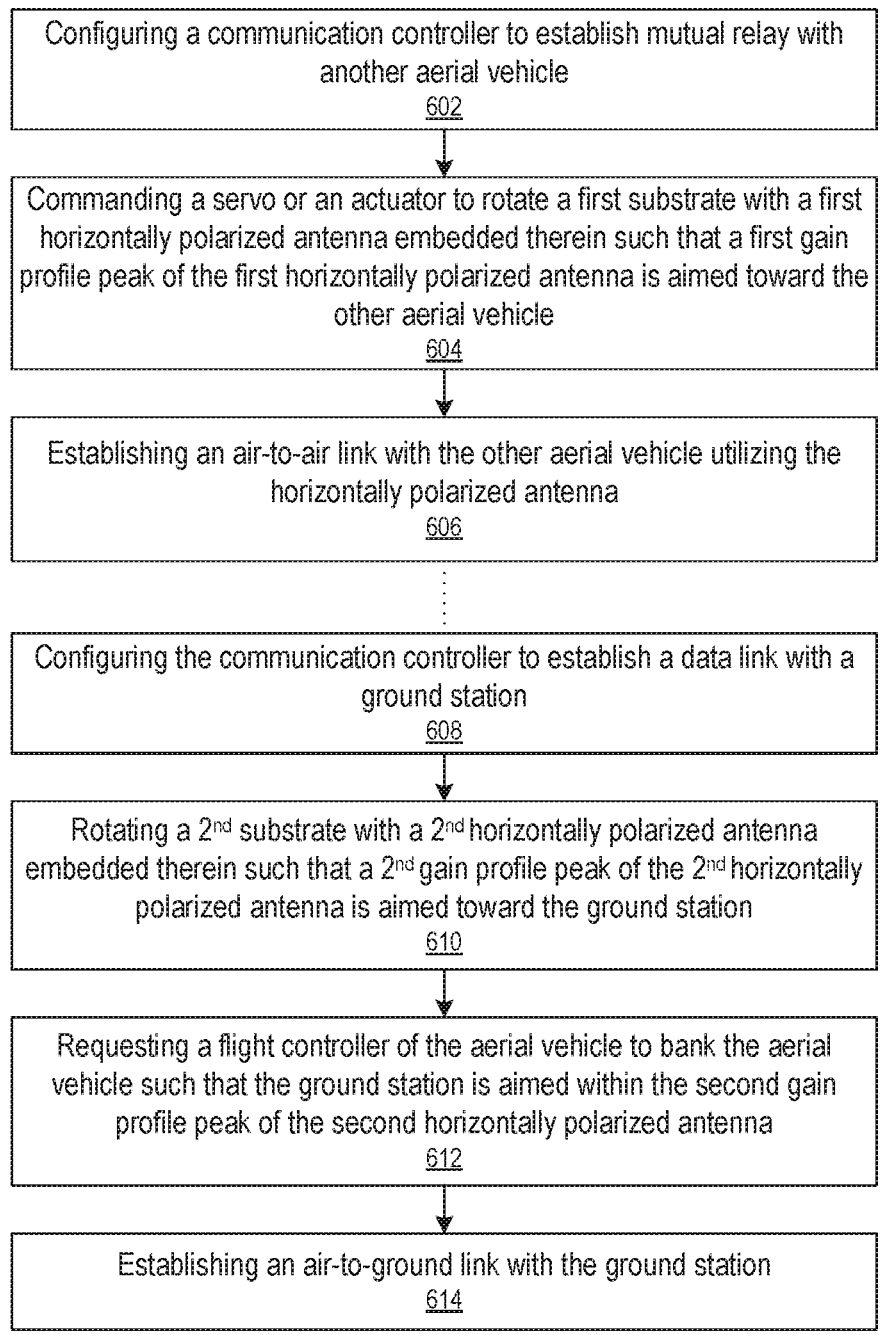
FIG. 6 is a flow chart of a method of operating a communication system of an aerial vehicle, in accordance with embodiments.

FIG. 6 is a flow chart of a method 600 of operating a communication system of an aerial vehicle, in accordance with embodiments. At step 602 of the method 600, a communication controller (e.g., the communication system 308 of FIG. 3) can be configured (e.g., via a remote command) to establish mutual relay (e.g., mutual point-to-point data link) with another aerial vehicle. At step 604, the communication controller can command a servo or an actuator (e.g., the mechanical rotation device 306 of FIG. 3) to rotate a first substrate (e.g., the substrate 202 of FIG. 2), such as a planar substrate, with a first horizontally polarized antenna (e.g., the antenna member 302 of FIG. 3) embedded therein such that a first gain profile peak of the first horizontally polarized antenna is aimed generally toward the other aerial vehicle. The first substrate can be exposed outside of the aerial vehicle. For example, a rotation device (e.g., the servo or actuator) can rotate the substrate, carried by a first aerial vehicle and having a horizontally polarized antenna embedded therein, such that a gain profile peak of the horizontally polarized antenna is aimed generally toward a second aerial vehicle. At step 606, the communication controller can establish an air-to-air link with the other aerial vehicle via the horizontally polarized antenna. For example, the communication controller can establish an air-to-air link between the first and second aerial vehicles via the horizontally polarized antenna.

At step 608, which can be executed in parallel or in series to steps 602, 604 and 606, the communication controller is configured (e.g., in response to a command from a flight controller or from a remote communication) to establish a data link with a ground station. At step 610, the communication controller can rotate a second substrate, such as a planar substrate, with a second horizontally polarized antenna embedded therein such that a second gain profile peak of the second horizontally polarized antenna is aimed toward the ground station. The second substrate can be exposed outside of the aerial vehicle and can be positioned with a nonparallel angle relative to a local (e.g., nearest) tangent plane of an external surface of the hull. At step 612, the communication controller can request a flight controller of the aerial vehicle to bank the aerial vehicle such that the second gain profile peak of the second horizontally polarized antenna is generally aimed at the ground station. At step 614, the communication controller can establish an air-to-ground communication link with the ground station. After step 614, the aerial vehicle farther away from the GCS can establish a BLOS communication link with the GCS by relaying communication through the aerial vehicle closer to the GCS. In one aspect of the foregoing embodiments, one antenna is used for air-to air communication, and a different antenna is used for air-to-ground communication. In other embodiments, the same antenna can provide both functions, e.g., via time-share usage of the antenna/communication system.

While processes or blocks are presented in a given order in FIG. 6, other embodiments include performing routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. In addition, while processes or blocks are at times shown as being performed in series, these processes or blocks may instead be performed in parallel, or may be performed at different times. When a process or step is "based on" a value or a computation, the process or step should be interpreted as based at least on that value or that computation.

One feature of particular embodiments of the disclosed technology is that they can include attaching a mechanically steered directional antenna that is horizontally polarized to a UAV. A mechanically steered antenna can be advantageous over an electrically steered antenna because it can consume less power. Another advantage of a directional and horizontally polarized antenna is that the UAV is able to transmit over long distances, given the same power constraints, due to the concentrated gain profile of the antenna. The concentrated gain profile further facilitates spatially discrete communication (e.g., increased privacy) and frequency reuse or multi-use within a local space. Horizontal polarization is advantageous because the antenna can have a very small cross section in the vertical plane, making the antenna relatively aerodynamic even without a housing. Another feature is that elements of the directional antenna can be embedded within a rotationally symmetric substrate, and thus reducing the aerodynamic impact (e.g., drag) resulting from steering the antenna to different angles. Yet another feature of some embodiments of the present technology is that the antenna is fixed to the aerial vehicle at a fixed angle. The beam elevation angle produced from the fixed angle antenna and the expected frequent banking of the UAV during normal operations can be sufficient for a GCS to capture the antenna's signals. This feature is advantageous because the antenna system can maintain a substantially similar aerodynamic profile during all operational states of the antenna.

From the foregoing, it will be appreciated that specific embodiments of the disclosed technology have been described herein for purposes of illustration, but that various modifications may be made without deviating from the technology. For example, elements of the disclosed antenna have been shown as a log periodic antenna, however, other antennae such as a dipole can be used in lieu of or in addition to a log periodic antenna. As another example, the actuating mechanism for rotating the antenna can be a servo, DC motor, and/or other suitable devices.

Certain aspects of the technology described in the context of particular embodiments may be combined or eliminated in other embodiments. For example, some embodiments of the antenna system may allow tilting of the antenna while other embodiments of the antenna system do not allow tilting of the antenna. Further, while advantages associated with certain embodiments of the disclosed technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein. Some embodiments of this disclosure have other aspects, elements, features, and steps in addition to or in place of those described above.

For example, some embodiments include an antenna system (e.g., an aerial vehicle antenna system) carried by an aerial vehicle. The antenna system includes a rotationally symmetric planar substrate (e.g., the substrate 202 of FIG. 2) with a horizontally polarized antenna (e.g., the antenna member 302 of FIG. 3) carried (e.g., embedded within or mounted thereon) thereby. The antenna system can include a communication controller (e.g., the communication system 308 of FIG. 3) and an electronic interconnect (e.g., interconnect 312 of FIG. 3) electrically coupled to the horizontally polarized antenna and the communication controller to communicate with the communication controller. The antenna system includes a rotation member (e.g., the rotary shaft 304 of FIG. 3) coupled to the rotationally symmetric planar substrate.

The antenna system can include a servo, electrically coupled to the communication controller, coupled to the rotation member to rotate the rotation member and thereby the rotationally symmetric planar substrate according to a command from the communication controller. The communication controller can be configured to provide air-to-air communication and/or air-to-ground communication by aiming a gain profile peak of the horizontally polarized antenna generally toward a communication target by actuating the servo. The communication controller can be coupled to a flight controller and configured to request the flight controller to tilt or bank the aerial vehicle toward the communication target when rotation of the rotationally symmetric planar substrate via the servo does not place the communication target within reach of a gain profile peak of the horizontally polarized antenna. The antenna system can further include a communication interface (e.g., the RF connector 310 of FIG. 3), electrically coupled to the communication controller. The communication interface can include at least one of a receiver, transmitter, or a transceiver. Some embodiments, the communication interface is carried by (e.g., embedded within or mounted on) the rotationally symmetric planar substrate.

Some embodiments include an antenna system (e.g., an aerial vehicle antenna system) for coupling to an aerial vehicle. The antenna system includes a planar substrate with a horizontally polarized antenna carried thereby (e.g., embedded therein or mounted thereon). The antenna system includes a rotation member (e.g., the rotary shaft 304 of FIG. 3) having a first end and a second end. The rotation member can carry the planar substrate (e.g., the substrate 202 of FIG. 2) with a non-perpendicular angle between a rotation axis of the rotation member and a major plane of the horizontally polarized antenna. The major plane is a plane overlapping a surface of the horizontally polarized antenna that intersects all or substantially all of conductive elements in the horizontally polarized antenna. The major plane can be transverse to the thickness of the horizontally polarized antenna. The first angle and/or the second angle can be substantially non-perpendicular angles (e.g., less than 75 degrees or 80 degrees). The antenna system can include an actuator (e.g., the mechanical rotation device 306 of FIG. 3) coupled to the rotation member to rotate the rotation member.

In some embodiments, the rotation member is a circular or elliptical rod. In some embodiments, the planar substrate includes a heat sink fin. In some embodiments, the horizontally polarized antenna comprises one or more conductive elements. The conductive elements can have a graduated thickness profile within the planar substrate. The conductive elements can be carried by (e.g., embedded within or plated thereon) the planar substrate at an angular (e.g., non-zero) tilt relative to the planar surface of the planar substrate.

Some embodiments include an aerial vehicle system. The aerial vehicle system includes an aerial vehicle and one or more antenna systems (e.g., the antenna system 300 of FIG. 3). For example, a first antenna system can include: a first planar substrate with a first horizontally polarized antenna carried by (e.g., embedded therein or mounted thereon); a first rotation member carrying the first planar substrate at a first fixed angle; and a first actuator coupled to the first rotation member to rotate the first rotation member. The first horizontal polarized antenna can be rotationally symmetric along at least one rotation axis. The aerial vehicle can have a wing tip portion, a winglet portion, a fuselage body portion, a forward portion, a aft portion, or any combination thereof. The first rotation member can be coupled above or below one of these portions. For example, a second antenna system can include: a second planar substrate carrying a second horizontally polarized antenna (e.g., embedded therein or mounted thereon); a second rotation member carrying the second planar substrate at a second fixed angle different from the first fixed angle; and a second actuator coupled to the second rotation member to rotate the second rotation member. In some embodiments, the first antenna system is configured for control data uplink and the second antenna system is configured for control data downlink. In some embodiments, the first antenna system is configured for control data uplink or control data downlink and the second antenna system is configured for surveillance data uplink.

We claim:
1. An aerial vehicle antenna system, comprising:
a rotationally symmetric planar substrate with an antenna embedded therein;
a communication controller electrically coupled to the antenna;
a signal detector coupled to the communication controller and to the antenna, the signal detector to detect signal quality of a signal received by the antenna;
a rotation member coupled to the rotationally symmetric planar substrate;
a servo, electrically coupled to the communication controller, and coupled to the rotation member to rotate the rotation member and the rotationally symmetric planar substrate in response to a command from the communication controller; and a memory coupled to the signal detector and to the communication controller to store at least one of an azimuthal angle or an elevation angle of the antenna corresponding to a selected detected signal quality.

2. The aerial vehicle antenna system of claim 1, wherein the selected detected signal quality is the highest of multiple detected signal strengths.

3. The aerial vehicle antenna system of claim 1, wherein the communication controller is to provide at least one of air-to-air communication or air-to-ground communication by actuating the servo to rotate the antenna to orient a dominant radiating direction of the antenna generally toward a direction corresponding to the selected detected signal quality.

4. The aerial vehicle antenna system of claim 3, wherein the communication controller is coupled to a flight controller and is to request the flight controller to tilt or bank an aerial vehicle that carries the aerial vehicle antenna system toward the direction corresponding to the selected detected signal quality.

5. The aerial vehicle antenna system of claim 4, wherein the communication controller is to determine a tilt or bank angle to request from the flight controller based on at least one of the stored azimuthal angle or elevation angle.

6. The aerial vehicle antenna system of claim 4, wherein the communication controller is to further receive a signal quality indication from the signal detector as the aerial vehicle banks or tilts, and request the flight controller to adjust the tilt or bank angle based on the received signal quality indication.

7. The aerial vehicle antenna system of claim 1, wherein the rotation member is to rotate the symmetric planar substrate about a center of gravity of the rotationally symmetric planar substrate.

8. The aerial vehicle antenna system of claim 1, wherein the rotationally symmetric planar substrate exhibits a disk shape, and wherein the rotationally symmetric planar substrate includes conductive elements embedded within, the conductive elements having an angular tilt relative to a flat surface of the disk shape of the substrate.

9. The aerial vehicle antenna system of claim 8, wherein the conductive elements are completely enclosed in the rotationally symmetric planar substrate.

10. A method of operating an aerial vehicle communication system, comprising:
rotating a planar substrate, carried by an aerial vehicle and having an antenna embedded therein;
periodically measuring, via a signal detector coupled to the antenna, a signal quality of a signal received by the antenna as the planar substrate is rotated; and
identifying at least one of an azimuthal angle or an elevation angle of the signal received by the antenna corresponding to a selected detected signal quality.

11. The method of claim 10, wherein the selected detected signal quality corresponds to a maximum measured signal quality.

12. The method of claim 10, wherein the antenna is horizontally polarized.

13. The method of claim 10, wherein the received signal is transmitted by an antenna of a ground communication station.

14. The method of claim 13, further including identifying a spatial location of the ground communication station using at least one of the identified azimuthal angle or elevation angle.

15. The method of claim 13, further including:
requesting a flight controller of the aerial vehicle to bank the aerial to aim a dominant radiating direction of the antenna generally toward the ground communication station.

16. The method of claim 13, further including:
storing the identified azimuthal angle and elevation angle;
identifying additional azimuthal angles and elevation angles of the antenna corresponding to additional measured signal strengths;
storing the additional angles referenced to the additional measured signal strengths; and
requesting a communication controller to rotate the planar substrate to orient the antenna generally towards a stored angle corresponding to a next best measured signal strength when communication with ground communication station degrades.

17. The method of claim 16, wherein an indication of a spatial location of the aerial vehicle is at least one of a GPS coordinate or an altitude indication.

18. The method of claim 10, further including:
requesting a flight controller of the aerial vehicle to bank the aerial vehicle to aim a dominant radiating direction of the antenna generally toward a direction of the received signal having a maximum measured signal strength.

19. The method of claim 10, further including:
requesting a flight controller of the aerial vehicle to bank the aerial vehicle based on at least one of the identified azimuthal angle or an elevation angle.

20. The method of claim 10, further including:
storing the identified azimuthal angle and elevation angle;
storing an indication of a spatial location of the aerial vehicle corresponding to the stored azimuthal angle and elevation angle; and
requesting a communication controller to rotate the planar substrate to orient the antenna generally towards the stored azimuthal angle or elevation angle when the aerial vehicle returns to the spatial location corresponding to the stored indication of the spatial location.

* * * * *